(12) United States Patent
Li et al.

(10) Patent No.: US 9,172,300 B2
(45) Date of Patent: Oct. 27, 2015

(54) CHARGE-PUMP VOLTAGE DIVIDER AND ASSOCIATED CONTROL METHOD

(71) Applicant: Chengdu Monolithic Power Systems Co., Ltd., Chengdu (CN)

(72) Inventors: Taofeng Li, Chengdu (CN); Yike Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 237 days.

(21) Appl. No.: 13/891,103

(22) Filed: May 9, 2013

(65) Prior Publication Data

US 2013/0300385 A1    Nov. 14, 2013

(30) Foreign Application Priority Data

May 9, 2012    (CN) .......................... 2012 1 0141086

(51) Int. Cl.
*H02M 3/07*    (2006.01)
*H02M 1/36*    (2007.01)

(52) U.S. Cl.
CPC *H02M 3/07* (2013.01); *H02M 1/36* (2013.01); H02M 2003/072 (2013.01)

(58) Field of Classification Search
CPC .... H02M 1/36; H02M 3/07; H02M 2003/072
See application file for complete search history.

(56) References Cited

U.S. PATENT DOCUMENTS

| | | | |
|---|---|---|---|
| 5,146,395 A * | 9/1992 | McKie | 363/13 |
| 6,445,623 B1 * | 9/2002 | Zhang et al. | 365/189.11 |
| 7,746,041 B2 * | 6/2010 | Xu et al. | 323/223 |
| 8,525,487 B1 * | 9/2013 | Stevenson | 320/166 |
| 2003/0174524 A1 * | 9/2003 | Botker et al. | 363/60 |
| 2007/0024347 A1 * | 2/2007 | Nagasawa et al. | 327/536 |
| 2007/0176671 A1 * | 8/2007 | Ishida | 327/536 |
| 2008/0013349 A1 * | 1/2008 | Yanagida et al. | 363/60 |
| 2008/0122522 A1 * | 5/2008 | Nagasawa et al. | 327/536 |
| 2013/0289538 A1 * | 10/2013 | Rogers et al. | 604/891.1 |
| 2014/0266099 A1 * | 9/2014 | Ku et al. | 323/273 |

* cited by examiner

*Primary Examiner* — Fred E Finch, III
(74) *Attorney, Agent, or Firm* — Perkins Coie LLP

(57) ABSTRACT

The embodiments of the present invention disclose a charge-pump voltage divider and associated start-up method. The charge-pump voltage divider comprises a start-up circuit that can regulate an inrush current during start up. The start-up circuit comprises a switch, which operates in linear region state during start-up, and operates in switching state after the start-up completes. The charge-pump voltage divider may further comprise a load control switch configured to ensure the start-up is independent of a load current.

9 Claims, 6 Drawing Sheets

US 9,172,300 B2

CHARGE-PUMP VOLTAGE DIVIDER AND ASSOCIATED CONTROL METHOD

CROSS-REFERENCE TO RELATED APPLICATION

This application claims priority to and the benefit of Chinese Patent Application No. 201210141086.0, filed May 9, 2012, which is incorporated herein by reference in its entirety.

TECHNICAL FIELD

The present invention generally relates to electronic circuit, and more particularly but not exclusively relates to charge-pump voltage divider and associated start-up method.

BACKGROUND

Charge pump is also referred to as switching-capacitor voltage converter, which is a DC-DC voltage converter based on capacitor energy storage. A charge pump generally controls the charging and discharging of a capacitor in switch mode so as to increase or decrease an input voltage of the charge pump with a certain factor, thereby obtaining a desired output voltage. Because of its high efficiency, small size, low cost and small EMI, charge pump is widely used in large-current and low-voltage portable products.

In U.S. Pat. No. 7,746,041 there is disclosed a charge-pump voltage divider topology which can be used in large-current and low-voltage applications. FIG. 1 schematically shows this charge-pump voltage divider 100, comprising switches M1-M4, a capacitor C1, and a capacitor Cout. The switches M1-M4 are sequentially connected in series between an input terminal and ground GND, wherein the input terminal is configured to receive an input voltage Vin. One terminal of the capacitor C1 is coupled to a common connection of the switches M1 and M2, and the other terminal of the capacitor C1 is coupled to a common connection of the switches M3 and M4. The capacitor Cout is paralleled to a load 102, wherein one terminal of capacitor Cout is coupled to a common connection of the switches M2 and M3, and the other terminal of capacitor Cout is connected to ground GND. A first control signal Q is used to control the ON state and OFF state of the switches M1 and M3, and a second control signal $\overline{Q}$ is used to control the ON state and OFF state of the switches M2 and M4, wherein the first control signal Q and the second control signal $\overline{Q}$ are complementary, i.e. when the first control signal Q is logic high, the second control signal $\overline{Q}$ is logic low, and vice versa. During operation, when the first control signal Q is logic high, the switches M1 and M3 are turned on, inversely, the switches M2 and M4 are turned off by the second control signal $\overline{Q}$. Thus, the capacitors C1 and Cout are connected in series, and the input voltage Vin charges the capacitors C1 and Cout. When the first control signal Q is logic low, the switches M1 and M3 are turned off, inversely, the switches M2 and M4 are turned on by the second control signal $\overline{Q}$. Thus, capacitors C1 and Cout are connected in parallel, the one with higher voltage between the capacitors C1 and Cout discharges to the one with lower voltage. The above operation process repeats until the voltage across the capacitor C1 equals to the voltage across capacitor Cout, and equals $$\frac{1}{2} Vin.$$

However, when the charge-pump voltage divider 100 starts up, the switches M1 and M3 are turned on instantaneously once the first control signal Q is logic high, yet the voltage across capacitor Cout is still zero. In this situation, an instantaneous large inrush current can occur, which may burn the switches M1 and M3 down.

Accordingly, a circuit and a method for controlling the start-up of the charge-pump voltage divider are desired.

SUMMARY

One embodiment of the present invention discloses a charge-pump voltage divider. The charge-pump voltage divider comprises: a first switch, a second switch, a third switch and a fourth switch sequentially connected in series between an input terminal and ground; a first capacitor having a first terminal and a second terminal, wherein the first terminal of the first capacitor is coupled to a common connection of the first switch and the second switch, and the second terminal of the first capacitor is coupled to a common connection of the third switch and the fourth switch; a second capacitor having a first terminal and a second terminal, wherein the first terminal of the second capacitor is coupled to a common connection of the second switch and the fourth switch, and the second terminal of the second capacitor is connected to ground; and a start-up circuit, comprising the first switch, wherein, during the start up of the charge-pump voltage divider, the start-up circuit is configured to control the first switch to operate in linear region.

Another embodiment of the present invention discloses a control method for operating a charge-pump voltage divider, wherein the charge-pump voltage divider comprises a first switch, a second switch, a third switch and a fourth switch sequentially connected in series between an input terminal and ground; a first capacitor having a first terminal coupled to a common connection of the first switch and the second switch and a second terminal coupled to a common connection of the third switch and the fourth switch; and a second capacitor having a first terminal coupled to a common connection of the second switch and the fourth switch and a second terminal connected to ground. The control method for operating a charge-pump voltage divider comprises: providing an input voltage to the input terminal of the charge-pump voltage divider; controlling the first switch to operate in linear region so as to regulate a inrush current flowing through the first switch, controlling the second switch and the fourth switch to turn ON, and controlling the third switch to turn OFF during the start up of the charge-pump voltage divider; and comparing an output voltage of the charge-pump voltage divider with a threshold voltage to determine whether the start up completes, wherein when the output voltage is lower than the threshold voltage, the charge-pump voltage divider starts up, and wherein when the output voltage is reached the threshold voltage, the start-up completes and the charge-pump voltage divider enters into normal operation

BRIEF DESCRIPTION OF THE DRAWINGS

Non-limiting and non-exhaustive embodiments are described with reference to the following drawings. The drawings are only for illustration purpose. Usually, the drawings only show part of the system or circuit of the embodiment, and the same reference label in different drawings have the same, similar or corresponding features or functions.

DETAILED DESCRIPTION

The embodiments of the present invention are described in next. While the invention will be described in conjunction with various embodiments, it will be understood that they are not intended to limit the invention to these embodiments. On contrary, the invention is intended to cover alternatives, modifications and equivalents, which may be included within the spirit and scope of the invention as defined by the appended claims. Furthermore, in the following detailed description of the embodiments of the present invention, numerous specific details are set forth in order to provide a thorough understanding of the embodiments of the present invention. However, it will be obvious to one of ordinary skill in the art that without these specific details the embodiments of the present invention may be practiced. In other instance, well-know circuits, materials, and methods have not been described in detail so as not to unnecessarily obscure aspect of the embodiments of the present invention.

Figure 2:
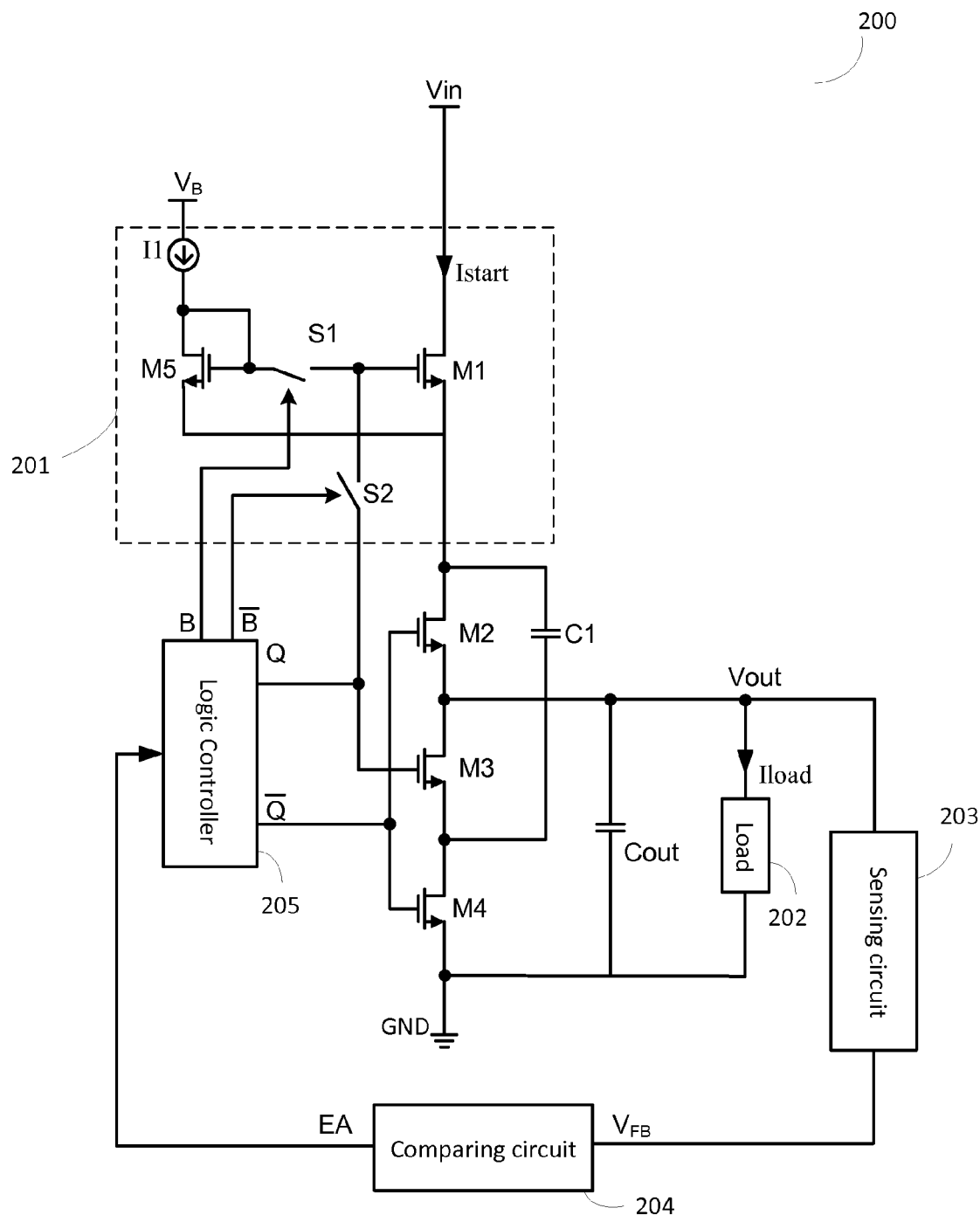
FIG. 2 schematically shows a charge-pump voltage divider with a start-up circuit according to an embodiment of the present invention.

FIG. 2 shows a charge-pump voltage divider 200 with a start-up circuit according to an embodiment of the present invention. Charge-pump voltage divider 200 comprises switches M1-M4, a capacitor C1, and a capacitor Cout. The switches M1-M4 are sequentially connected in series between an input terminal and ground GND, wherein the input terminal is configured to receive an input voltage Vin. One terminal of the capacitor C1 is coupled to a common connection of the switches M1 and M2, and the other terminal of the capacitor C1 is coupled to a common connection of the switches M3 and M4. The capacitor Cout is paralleled to a load 202, wherein one terminal of the capacitor Cout is coupled to a common connection of the switches M2 and M3, and the other terminal is connected to ground GND. A first control signal Q is used to control the ON state and OFF state of the switches M1 and M3, and a second control signal $\overline{Q}$ is used to control the ON state and OFF state of the switches M2 and M4, wherein the first control signal Q and the second control signal $\overline{Q}$ are complementary, i.e. when the first control signal Q is logic high, the second control signal $\overline{Q}$ is logic low, and vice versa.

Charge-pump voltage divider 200 further comprises a start-up circuit 201. In one embodiment, start-up circuit 201 comprises a mirror current source, a first control switch S1, and a second control switch S2. The first control switch S1 and the second control switch S2 are provided for controlling the mirror current source. The mirror current source may comprise switches M5, M1, and a current source I1. Each of the switches M5 and M1 may comprise a source, a drain and a gate, wherein the gate is able to control a conduction channel between the source and the drain in response to a gate control signal when applied. The first control switch S1 is coupled between the gate of the switch M1 and the gate of the switch M5, wherein the gate and drain of the switch M5 are connected, and the second control switch S2 is coupled between the gate of the switch M1 and an input terminal receiving the first control signal Q. The current source I1 is coupled between the drain of the switch M5 and an input terminal receiving a supply voltage, e.g. $V_B$. The source of switch M5 is coupled to the source of the switch M1, and the drain of the switch M1 is coupled to an input voltage terminal receiving the input voltage Vin. In one embodiment, the switches M1, M2, M3, M4, and M5 are NMOSFET.

During start-up of the charge-pump voltage divider 200, the first control switch S1 is ON and the second control switch S2 is OFF so as to control the mirror current source to be connected to the charge-pump voltage divider 200. In this case, when the first control signal Q is logic low and correspondingly the second control signal $\overline{Q}$ is logic high, the switches M2, M4 are ON and the switch M3 is OFF, thus, the switches M1, M5 and the current source I1 operates as a mirror current source. The capacitors C1 and Cout connected in parallel are charged by the inrush current Istart which is controlled by the current source I1. When the capacitor Cout is charged until the output voltage Vout reaches a threshold voltage Vrss (shown in FIG. 3), the start-up of the charge-pump voltage divider 200 is over.

After the start-up, the first control switch S1 is OFF and the second control switch S2 is ON so as to disconnect the mirror current source from the charge-pump voltage divider 200. In the meanwhile, the gate of switch M1 is now configured to receive the first control signal Q directly since the second control switch S2 is ON. Thus, the charge-pump voltage divider 200 enters into normal operation. That is to say, the switches M1, M3 and the switches M2, M4 are turned ON and OFF alternately in response to the first control signal Q and the second control signal $\overline{Q}$, until the output voltage Vout is regulated to be equal to $$\frac{1}{2}Vin,$$

as has been addressed in the BACKGROUND section.

Figure 1:
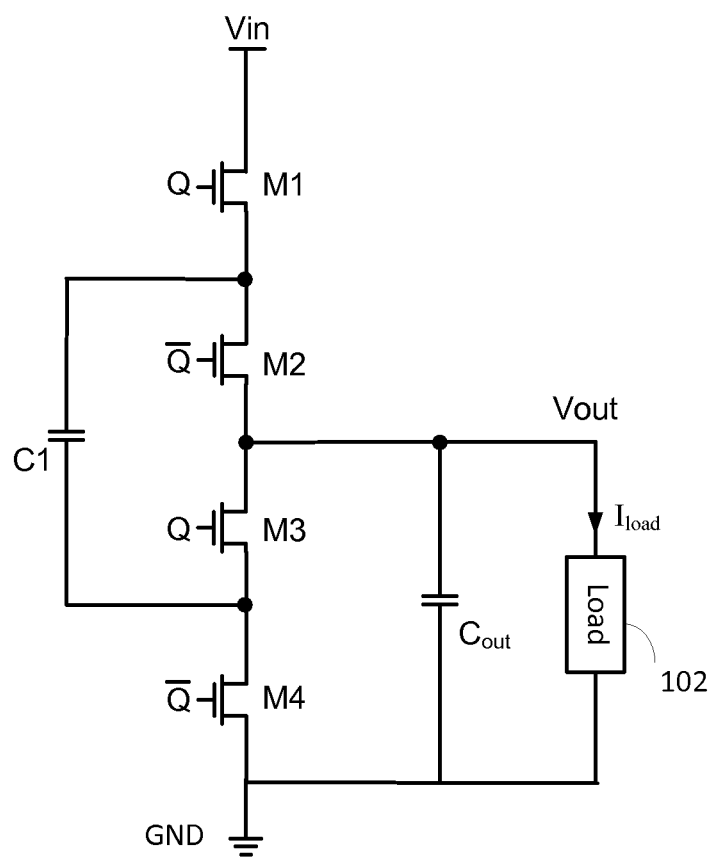
FIG. 1 shows a prior art charge-pump voltage divider.

Based on the controlling of the switch M5, the first control switch S1, the second control switch S2 and the current source I1, the switch M1 in the start-up circuit 201 not only operates in ON state or OFF state, but also operates in linear region state when it acts as a part of the mirror current source and works in combination with the switch M5 and the current source I1 to regulate the inrush current Istart during start-up. Therefore, according to the exemplary embodiment shown in FIG. 2, the start-up circuit 201 can control the start-up inrush current Istart by controlling the switch M1, which is an original component in a conventional charge-pump voltage divider such as the charge-pump voltage divider 100 shown in FIG. 1. Thus, the charge-pump voltage divider 200 comprising the start-up circuit 201 can regulate the inrush current Istart according to different applications and start up smoothly without elements burning down. Meanwhile, the start-up circuit 201 herein has at least a switch element such as the switch M1 saved, thus is cost efficient.

The charge-pump voltage divider 200 further comprises a sensing circuit 203, a comparing circuit 204 and a logic controller 205. The sensing circuit 203 is configured to sense the output voltage Vout and provide a sensing signal $V_{FB}$. The comparing circuit 204 is configured to receive the sensing signal $V_{FB}$ and compare it with a reference signal to provide a comparing signal EA, as is familiar to one of ordinary skill in the art. The logic controller 205 is configured to receive the comparing signal EA and provide a plurality of signals comprising the first control signal Q, the second control signal $\overline{Q}$, a third control signal B, and a fourth control signal $\overline{B}$ to the switches M1-M4, the first control switch S1, and the second control switch S2 respectively. The third control signal B is used to control the ON state and OFF state of the first control switch S1, and the fourth control signal $\overline{B}$ is used to control the ON state and OFF state of the second control switch S2, wherein the third control signal B and the fourth control signal $\overline{B}$ are complementary, i.e. when the third control signal B is logic high, the fourth control signal $\overline{B}$ is logic low, and vice versa. In certain circumstances, the inrush current Istart must be greater than the load current Iload so that the output capacitor Cout can be charged to the threshold voltage Vrss since the load current Iload may not be zero when the charge-pump voltage divider starts up. That is to say, if the load current Iload is relatively large during the charge-pump voltage divider 200 starting up, the start-up process may not be completed successfully.

Figure 3:
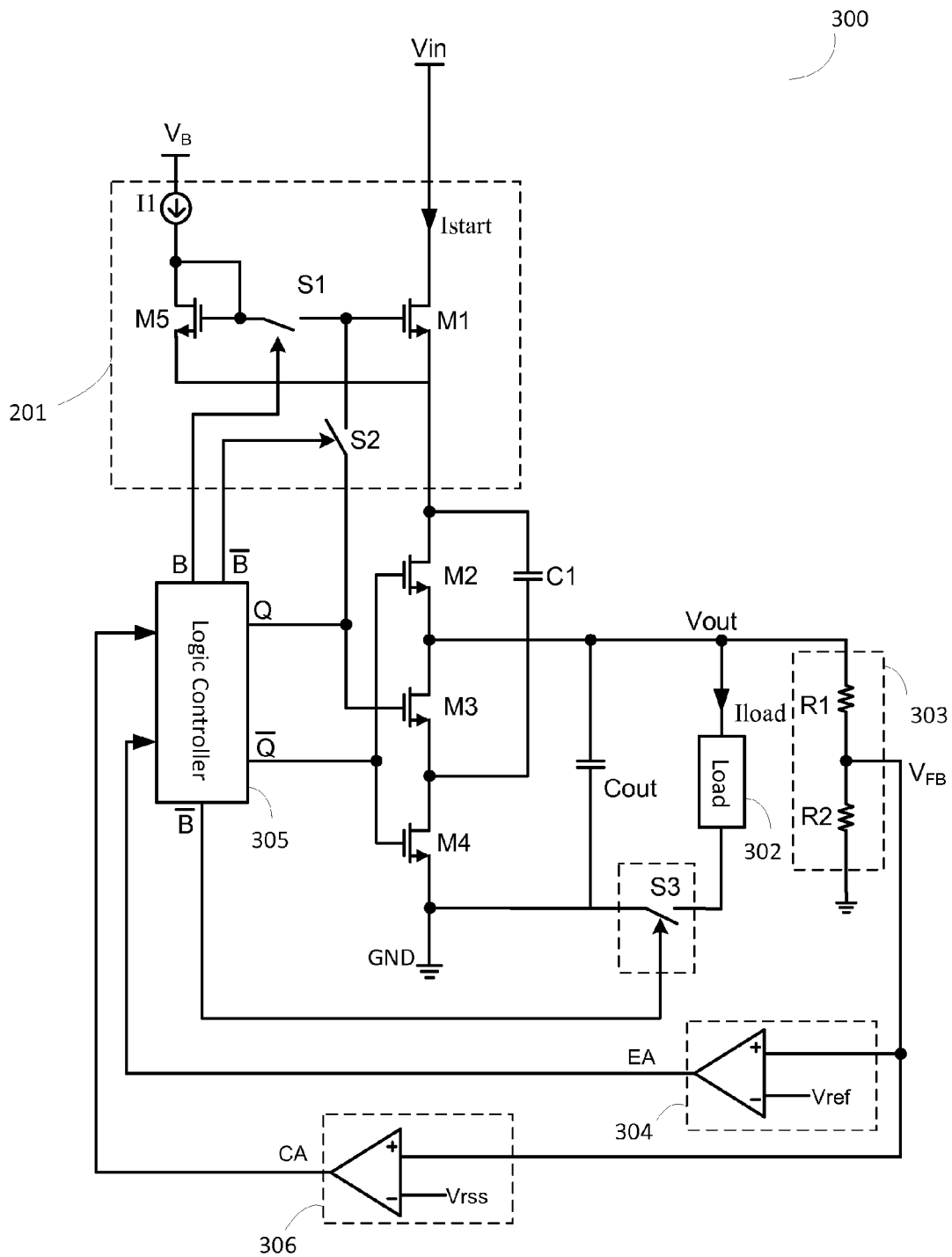
FIG. 3 schematically shows a charge-pump voltage divider having a start-up circuit, and a load control switch according to an embodiment of the present invention.

FIG. 3 schematically shows a charge-pump voltage divider 300 having a start-up circuit, and a load control switch according to an embodiment of the present invention. In order to reduce/eliminate the impact of the load current Iload to the start-up process, a load control switch is provided between a load and ground GND of the charge pump voltage divider 300. As shown in FIG. 3, compared with the charge-pump voltage divider 200, the charge-pump voltage divider 300 further comprises a load control switch S3 having a first terminal coupled to load 302 and a second terminal connected to ground GND. The charge-pump voltage divider 300 may further comprise a sensing circuit 303, an error amplifying circuit 304, a comparing circuit 306 and a logic controller 305. In the embodiment shown, the sensing circuit 303 may be a resistor divider circuit comprising divider resistors R1 and R2, which generates a feedback signal $V_{FB}$ proportional to the output voltage Vout. The error amplifying circuit 304 is configured to receive the feedback signal $V_{FB}$ and compare it with a reference signal Vref to output a difference signal EA indicating the difference value between the feedback signal $V_{FB}$ and the reference signal Vref. The comparing circuit 306 is configured to receive the feedback signal $V_{FB}$ and compare it with a threshold voltage signal Vrss to output a comparing signal CA. The logic controller 305 receives the difference signal EA and the comparing signal CA, and is configured to output a plurality of control signals comprising the first control signal Q, the second control signal $\overline{Q}$, the third control signal B, and the fourth control signal $\overline{B}$ to the switches M1-M4, the first control switch S1, and the second control switch S2, and the load control switch S3, wherein the load control switch S3 is controlled by the fourth control signal $\overline{B}$.

In the embodiment shown in FIG. 3, the value of threshold voltage Vrss is equal to the output voltage Vout, in other embodiment, the threshold voltage Vrss can be set to other reasonable values, for example, $$\frac{1}{2} Vout.$$

Before the output voltage Vout reaches the threshold voltage Vrss, the charge-pump voltage divider 300 operates in start-up process, and the load control switch S3 is set OFF to disconnect the load 302 from the charge-pump voltage divider 300 so that the load current Iload is substantially zero. The logic controller 305 is configured to set the first control switch S1 ON, and set the second switch S2 OFF. Furthermore, the logic controller 305 is further configured to set the first control signal Q to logic low, and correspondingly set the second control signal $\overline{Q}$ to logic high. Thus, the switches M2, M4 are turned ON, the switch M3 is turned OFF, and the switches M1, M5 and the current source I1 operate as a mirror current source. The capacitors C1 and Cout connected in parallel are charged by the inrush current Istart which is controlled by the current source I1. The start-up process completes after the output voltage Vout reaches the threshold voltage Vrss, in the meanwhile, the first control switch S1 is set OFF, the second control switch S2 and the load control switch S3 are set ON. Thus the load switch S3 connects the load 302 back to the charge-pump voltage divider 300, and accordingly, the switch M1 receives the first control signal Q directly. Through the alternating ON and OFF action of switches M1, M3 and switches M2, M4, the output voltage Vout is regulated until it equals to $$\frac{1}{2} Vin.$$

In other embodiments, other suitable start-up circuit having different configurations from the start-up circuit 201 in FIG. 3 may be used without departing from the spirit of the present invention.

In the example embodiment of FIG. 3, the load control switch S3 can keep the load current Iload of the charge-pump voltage divider 300 to be zero during start-up, and the inrush current Istart is controlled by the current source I1. Therefore, the charge-pump voltage divider 300 can start up smoothly without a huge inrush current resulting in burning switches down.

Figure 4:
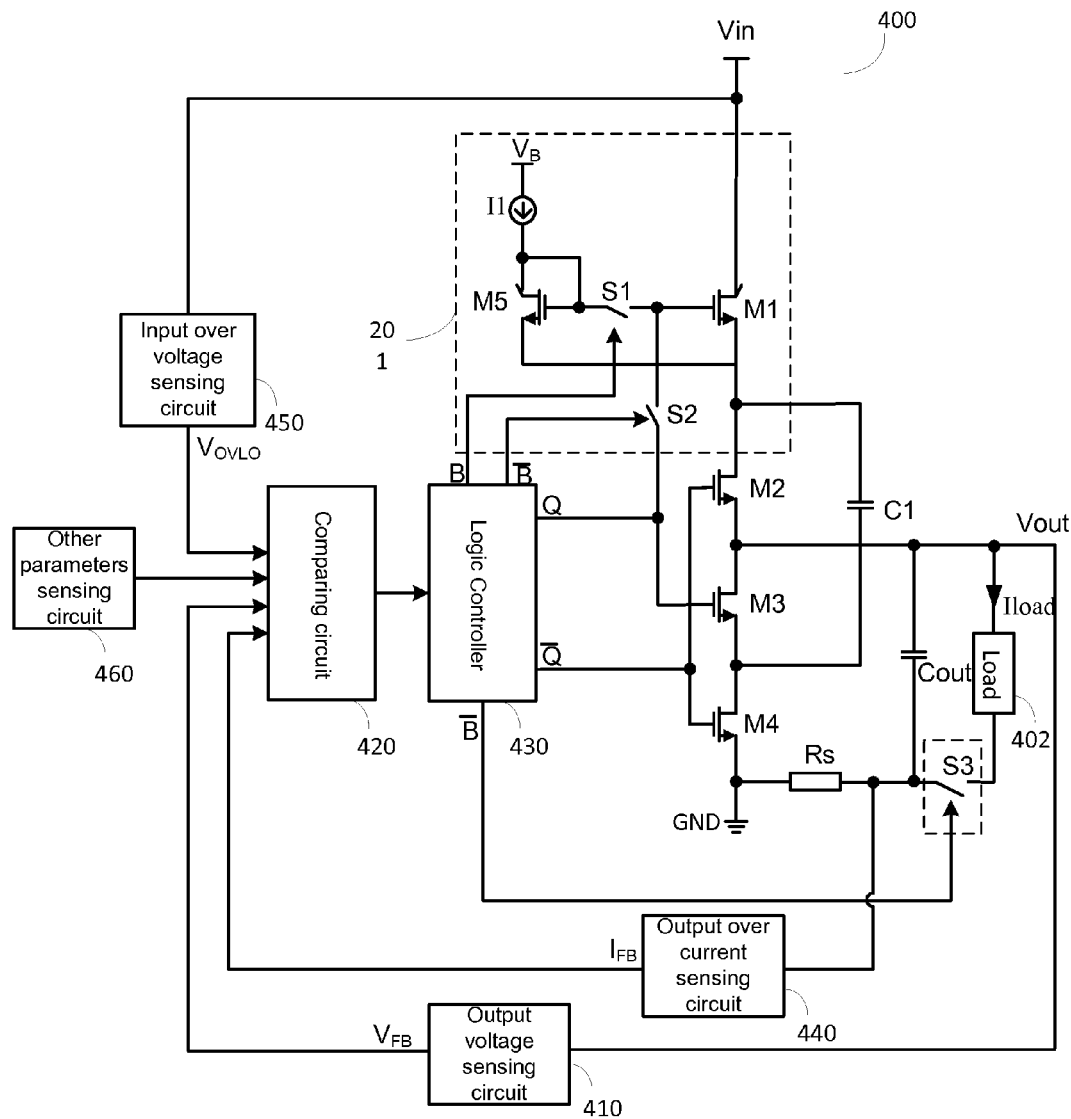
FIG. 4 schematically shows a charge-pump voltage divider with a plurality of protection circuits according to an embodiment of the present invention.

FIG. 4 schematically shows a charge-pump voltage divider 400 with a plurality of protection circuits according to an embodiment of the present invention. Besides comprising an output voltage sensing circuit 410, the charge-pump voltage divider 400 further comprises an output over current sensing circuit 440, an input over voltage sensing circuit 450, a comparing circuit 420, a logic controller 430 and other-parameter sensing circuit 460 as shown in FIG. 4.

The output voltage sensing circuit 410 is configured to sense the output voltage Vout and generate a voltage feedback signal $V_{FB}$. The output over current sensing circuit 440 is configured to sense the output current Iload and generate a current feedback signal $I_{FB}$. Input over voltage sensing circuit 450 is configured to sense the input voltage Vin and generate a voltage signal $V_{OVLO}$. Similarly, other parameters sensing circuit 460 is configured to sense other parameters, e.g. temperature, short circuit indication parameter, input under-voltage, output over-voltage etc. and generate a plurality of sensing signals.

The comparing circuit 420 is configured to receive the feedback signal $V_{FB}$, the current feedback signal $I_{FB}$, the voltage signal $V_{OVLO}$, and the plurality of sensing signals and compare them with reference parameters respectively to generate a plurality of comparing signals. Especially, the load control switch S3 keeps OFF until the output voltage Vout is equal to the threshold voltage Vrss during the charge-pump voltage divider 400 start-up process.

Meanwhile, the load control switch S3 may operate as a protection switch. After the charge-pump voltage divider 400 enters into normal operation, the load control switch S3 can be set OFF once the output current, the input voltage Vin or the plurality of sensing signals are greater than the reference parameters respectively.

Logic controller 430 receives the plurality of comparing signals and output a plurality of control signals comprising the first control signal Q, the second control signal $\overline{Q}$, the third control signal B, and the fourth control signal $\overline{B}$ to the switches M1-M4, the first control switch S1, and the second control switch S2, and the load control switch S3 respectively, wherein the load control switch S3 is controlled by the fourth control signal $\overline{B}$.

Figure 5:
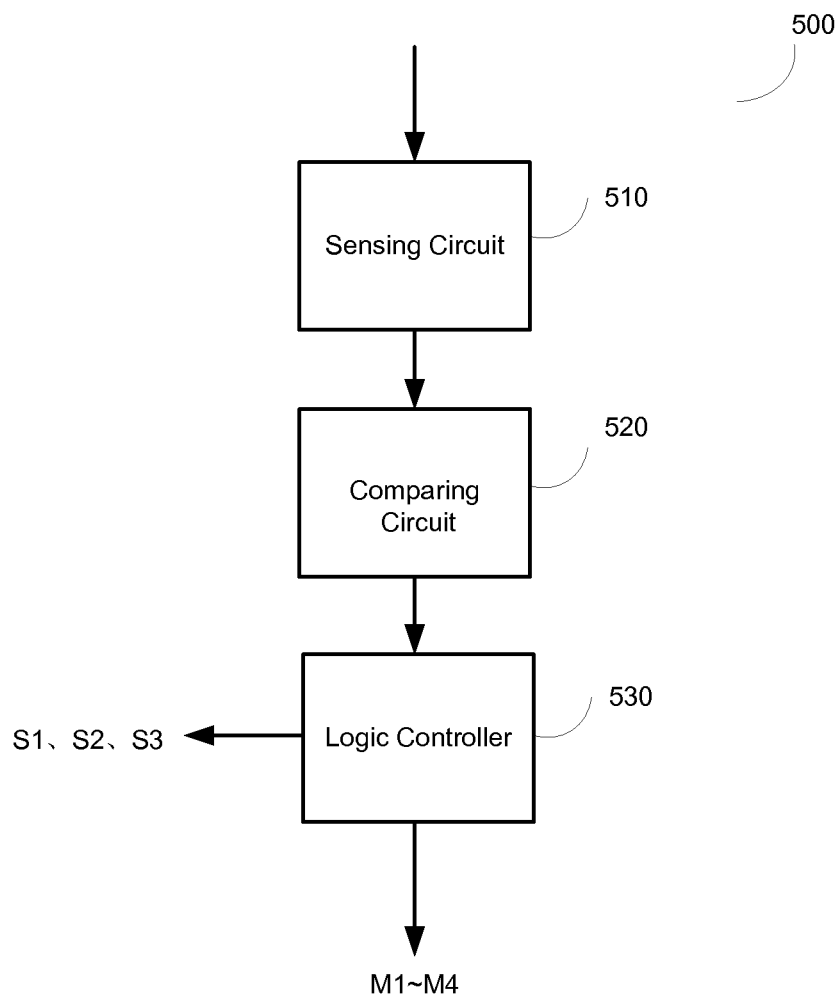
FIG. 5 illustrates a control loop in charge-pump voltage divider according to an embodiment of the present invention.

FIG. 5 illustrates a control loop 500 in charge-pump voltage divider according to an embodiment of the present invention. The control loop 500 comprises a sensing circuit 510, a comparing circuit 520, and a logic controller 530. the sensing circuit 510 is configured to sense, e.g. the output voltage Vout, the input voltage Vin, and the output current etc., and output a plurality of sensing signals. Comparing circuit 520 is configured to receive the plurality of sensing signals and compare them with respective reference values so as to generate a plurality of comparing results. Logic controller 530 is configured to receive the plurality of comparing results and output a plurality of corresponding control signals to the switches M1-M4, the first control switch S1, the second control switch S2, and the load control switch S3 respectively.

Figure 6:
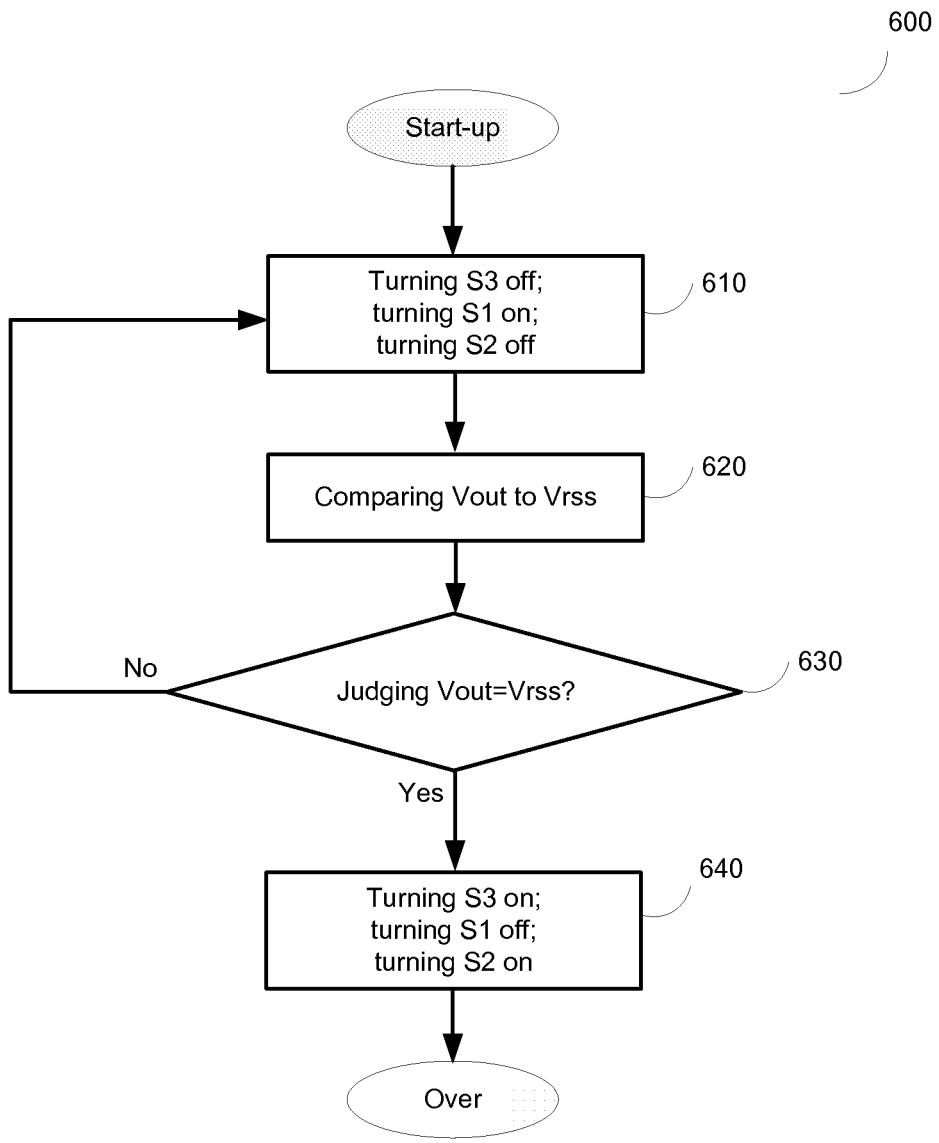
FIG. 6 illustrates a flow diagram illustrating a control method for controlling the start-up of a charge-pump voltage divider according to an embodiment of the present invention.

FIG. 6 illustrates a flow diagram illustrating a control method 600 for controlling the start-up of a charge-pump voltage divider according to an embodiment of the present invention. The charge-pump voltage divider operated according to the control method 600 may comprise any one of the charge-pump voltage dividers 200, 300 and 400 described above or any variant of the charge-pump voltage dividers 200, 300 and 400. The control method 600 may comprise steps 610-640.

After providing an input voltage to the input terminal of the charge-pump voltage divider, the charge-pump voltage divider operates by a start-up circuit. As shown in the embodiments described earlier in this disclosure, the start-up circuit may comprise a mirror current source, a first control switch S1 and a second control switch S2, and the charge-pump voltage divider may further comprise a load control switch S3. In step 610, the logic controller generates a plurality of control signals to the load control switch S3, the first control switch S1, and the second control switch S2 respectively so as to turn the load switch S3 and the second control switch S2 off, and turn the first control switch S1 on once the charge-pump voltage divider begin to start up. In this circumstance, the start-up circuit controls the first switch M1 to operate in linear region so as to regulate an inrush current Istart flowing through the first switch M1.

In step 620, output voltage Vout is sensed by a sensing circuit to generate a feedback voltage signal $V_{FB}$ which is proportional to the output voltage Vout. The comparing circuit is configured to compare the feedback voltage signal $V_{FB}$ with a threshold voltage Vrss and generate a comparing signal.

In step 630, the method may further comprise judging the output voltage Vout whether reaches the threshold voltage Vrss according to the comparing signal to determine whether the start up completes. If the output voltage Vout reaches the threshold voltage Vrss, which means the start up completes and the charge-pump voltage divider enters into normal operation, thus the control method turns to step 640. Otherwise, the control method returns to the step 610 to continue the start-up process.

Continue with FIG. 6, in step 640, when the output voltage reaches the threshold voltage, the start-up completes, thus, the load control switch S3 and the second control switch S2 are set on, and the first control switch S1 is set off so that the start-up circuit is disconnected from the charge-pump voltage divider. The charge-pump voltage divider begins to operate in steady state to regulate the output voltage Vout.

It should be noted that the ordinary skill in the art should know that the start-up method presented in this invention not only limited in this voltage divider topology, but also in other large current applications needed charge-pump. Similarly, the sensing circuit, controller etc. presented in this invention only used to schematically show a method as an example.

While various embodiments have been described above, it should be understood that they have been presented by way of example only, and not limitation. Thus, the breadth and scope of a prefV1ed embodiment should not be limited by any of the above-described exemplary embodiments, but should be defined only in accordance with the following claims and their equivalents.

We claim:

1. A charge-pump voltage divider, comprising:
   a first switch, a second switch, a third switch and a fourth switch sequentially connected in series between an input terminal and ground;
   a first capacitor having a first terminal and a second terminal, wherein the first terminal of the first capacitor is coupled to a common connection of the first switch and the second switch, and the second terminal of the first capacitor is coupled to a common connection of the third switch and the fourth switch;
   a second capacitor having a first terminal and a second terminal, wherein the first terminal of the second capacitor is coupled to a common connection of the second switch and the third switch, and the second terminal of the second capacitor is connected to ground;
   a start-up circuit comprising the first switch;
   a load control switch having a first terminal and a second terminal, wherein the first terminal of the load control switch is coupled to a load of the charge-pump voltage divider, and the second terminal of the load control switch is connected to ground; and
   a logic controller, configured to provide a plurality of control signals to the start-up circuit, the second switch, the third switch, the fourth switch and the load control switch according to an output voltage across the second capacitor of the charge-pump voltage divider; and wherein
   when the output voltage is lower than a threshold voltage, the plurality of control signals is configured to control the charge-pump to operate in a start-up stage so as to turn the load control switch OFF to disconnect the load from the charge-pump voltage divider, and to operate the first switch in a linear region;
   when the output voltage is higher than the threshold voltage, the plurality of control signals is configured to turn the load control switch ON to connect the load to the charge-pump voltage divider, and is further configured to switch the first switch ON and OFF alternately; and wherein
   during the start-up stage of the charge-pump voltage divider, the plurality of control signals is configured to maintain the second switch and the fourth switch ON, and maintain the third switch OFF.

2. The charge-pump voltage divider of claim 1, wherein the plurality of control signals comprise a first control signal and a second control signal; wherein the first control signal is configured to switch the first switch and the third switch ON and OFF; wherein the second control signal is configured to switch the second switch and the fourth switch ON and OFF; wherein the first control signal and the second control signal are complementary.

3. The charge-pump voltage divider of claim 2, wherein the start-up circuit further comprises a current source, a fifth switch, a first control switch and a second control switch; and wherein
- each of the first switch and the fifth switch has a source, a drain and a gate, and each of the first control switch and the second control switch has a first terminal and a second terminal; and wherein:
- the drain of the fifth switch is coupled to the current source, the source of the fifth switch is coupled to the source of the first switch, and the gate of the fifth switch is coupled to the first terminal of the first control switch; and wherein
- the gate of the first switch is coupled to the second terminal of the first control switch; wherein
- the first terminal of the second control switch is coupled to the logic controller for receiving the first control signal, and the second terminal of the second control switch is coupled to the gate of the first switch;
- wherein the plurality of control signals further comprise a third control signal and a fourth control signal; wherein the third control signal is configured to switch the first control switch ON and OFF; wherein the fourth control signal is configured to switch the second control switch and the load control switch ON and OFF; wherein the third control signal and the fourth control signal are complementary; wherein during the start-up stage of the charge-pump voltage divider, the third control signal is configured to turn the first control switch ON, and the fourth control signal is configured to turn the second control switch and the load control switch OFF; and wherein after the start-up stage of the charge-pump voltage divider, the third control signal is configured to turn the first control switch OFF, and the fourth control signal is configured to turn the second control switch and the load control switch ON.

4. The charge-pump voltage divider of claim 3, wherein the first switch, the second switch, the third switch, the fourth switch and the fifth switch are N-channel MOSFETs.

5. The charge-pump voltage divider of claim 3, further comprising:
- an output voltage sensing circuit, configured to sense an output voltage of the charge-pump voltage divider and to output a sensing signal;
- a comparing circuit, configured to receive the sensing signal and compare the sensing signal with a threshold voltage to output a comparing signal; and wherein
- the logic controller is configured to receive the comparing signal and provide the plurality of the control signals.

6. A control method for operating a charge-pump voltage divider, wherein the charge-pump voltage divider comprises a first switch, a second switch, a third switch and a fourth switch sequentially connected in series between an input terminal of the charge-pump voltage divider and ground; a first capacitor having a first terminal coupled to a common connection of the first switch and the second switch and a second terminal coupled to a common connection of the third switch and the fourth switch; and a second capacitor having a first terminal coupled to a common connection of the second switch and the third switch and a second terminal connected to ground; and wherein the control method comprises:
- providing an input voltage to the input terminal of the charge-pump voltage divider;
- providing a load control switch with a first terminal coupled to the first terminal of the second capacitor via a load and a second terminal connected to ground;
- controlling the first switch to operate in a linear region so as to regulate an inrush current flowing through the first switch, controlling the second switch and the fourth switch to be maintained ON, and controlling the third switch to be maintained OFF while setting the load control switch OFF during the start-up stage of the charge-pump voltage divider; and
- comparing an output voltage of the charge-pump voltage divider with a threshold voltage to determine whether the start-up stage is completed, wherein when the output voltage is lower than the threshold voltage, the charge-pump voltage divider starts up, and wherein when the output voltage reaches the threshold voltage, the load control switch is turned ON and the start-up stage is completed.

7. The control method of the claim 6, wherein controlling the first switch to operate in linear region comprises:
- providing a start-up circuit to regulate the first switch in linear region during start-up; and
- disconnecting the start-up circuit from the charge-pump voltage divider when the start-up stage is completed.

8. The control method of claim 7, wherein providing the start-up circuit comprises:
- providing a current source, a fifth switch, a first control switch and a second control switch; wherein the fifth switch has a source, a drain and a gate, the first control switch has a first terminal and a second terminal, and the second control switch has a first terminal and a second terminal;
- coupling the drain, the source and the gate of the fifth switch respectively to the current source, the source of the first switch, and the first terminal of the first control switch, coupling the gate of the first switch to the second terminal of the first control switch, and coupling the second control switch between the gate of the first switch and the gate of the third switch;
- setting the first control switch ON, and the second control switch OFF during the start-up stage; and
- setting the first control switch OFF, and the second control switch ON after the start-up stage is completed.

9. The control method of the claim 8, wherein the first switch, the second switch, the third switch, the fourth switch and the fifth switch are N-channel MOSFETs.

* * * * *